United States Patent
Ekermans

[19]
[11] Patent Number: 6,121,884
[45] Date of Patent: Sep. 19, 2000

[54] GAS FLOW DETECTOR

[75] Inventor: Wilhelm Eugene Ekermans, Western Cape, South Africa

[73] Assignee: Suregas (Proprietary) Limited, Western Cape, South Africa

[21] Appl. No.: 09/043,133

[22] PCT Filed: Sep. 11, 1996

[86] PCT No.: PCT/US96/14432

§ 371 Date: Mar. 10, 1998

§ 102(e) Date: Mar. 10, 1998

[87] PCT Pub. No.: WO97/12215

PCT Pub. Date: Apr. 3, 1997

[30] Foreign Application Priority Data

Sep. 11, 1995 [ZA] South Africa ............................ 95/7611

[51] Int. Cl.[7] .................................................. G08B 21/00
[52] U.S. Cl. ........................ 340/605; 340/606; 340/610; 340/611; 73/861.54
[58] Field of Search .................................... 340/606, 609, 340/610, 611, 605; 73/861.42, 861.49, 861.53, 861.54, 861.55, 861.56, 861.57; 200/81.9 R, 81.9 M, 82 R, 82 E; 307/116, 118

[56] References Cited

U.S. PATENT DOCUMENTS

| | | | |
|---|---|---|---|
| 3,070,232 | 12/1962 | Casaleggi | 210/90 |
| 3,446,986 | 5/1969 | Cox | 307/118 |
| 3,805,611 | 4/1974 | Hedland | 73/861.54 |
| 4,181,835 | 1/1980 | Stadler et al. | 340/610 |
| 4,315,436 | 2/1982 | Mc Cabe | 73/861.54 |
| 4,738,395 | 4/1988 | Chilton et al. | 236/23 |
| 4,763,114 | 8/1988 | Eidsmore | 340/606 |
| 5,304,757 | 4/1994 | Hansel | 200/82 R |

FOREIGN PATENT DOCUMENTS

| | | |
|---|---|---|
| 2236091 | 4/1973 | Germany . |
| 1224670 | 9/1989 | Japan . |
| 1125688 | 8/1968 | United Kingdom . |
| WO8300220 | 1/1983 | WIPO . |

OTHER PUBLICATIONS

Abstract of Japanese JP 01–224670 Dated Sep. 1989.

*Primary Examiner*—Jeffery A. Hofsass
*Assistant Examiner*—Van T. Trieu
*Attorney, Agent, or Firm*—Ladas & Parry

[57] ABSTRACT

A gas flow detector (10) includes a casing (12) with an inlet (14) for connection to a gas source and an outlet (16) for connection to a gas using appliance. Between the inlet and outlet there is an internal chamber (18) which receives a sleeve (24). Gas flow from the inlet (14) to the outlet (16) around the sleeve (24) is prevented by a seal (22) which encircles the sleeve (24). A piston (38) having a magnet (44) mounted at the lower end thereof moves in the sleeve (24) from a lower position (as illustrated) to an upper position. The piston (38) drops under gravity to its lower position when there is no gas flow. It lifts to its upper position as soon as there is gas flow. A magnetically operated switch (54) is provided below the position that the magnet (44) occupies when the piston (38) is in its lower position.

13 Claims, 2 Drawing Sheets

GAS FLOW DETECTOR

BACKGROUND OF THE INVENTION

This invention relates to a gas flow detector.

Inflammable gases such as liquid petroleum gas (LPG) are used for purposes such as cooking, refrigeration, and water heating in boats and in recreational vehicles of many types such as caravans and campers. Inflammable gases are also used in industry as well as holiday homes and cottages which are not supplied with electricity.

Such gases are heavier than air and if there is a leak the gases accumulate in the bottom of the boat, at the caravan floor, in a basement, etc. depending on where the gas supply is located. Even a minute leak can result, over a period of time, in gas collecting in sufficient volume to give rise to a potentially explosive mixture.

Conventionally there is a shut-off valve and regulator at the gas bottle but, once the bottle is in use, this valve is generally left open. It is thus of no value in preventing escape of gas through an open but unlit burner, through a pilot light that is out, or through a leak in a pipe or a pipe fitting.

The present invention seeks to provide a detector which is sensitive to very low rates of gas flow and thus reacts should there be a slow leak from the gas system.

BRIEF SUMMARY OF THE INVENTION

According to the present invention there is provided a gas flow detector comprising a casing having a gas inlet and a gas outlet, a cylinder within said casing, a piston in said cylinder, a flow path from said inlet to a space below said piston, a flow path from a space above said piston to said outlet, lifting of said piston from a lower position it occupies when there are equal gas pressures at said inlet and outlet to an upper position it occupies when the pressure at said outlet is lower than the pressure at said inlet placing said spaces in communication with one another, a magnet carried by said piston at the lower end thereof, and a magnetically operated switch below said piston and which is subjected to the field of said magnet when said piston is in said lower position.

Said cylinder is preferably arranged with its axis vertical so that the piston moves vertically but it can be at an angle of up to, say, 45 degrees with respect to vertical.

In the preferred form, the piston is hollow and comprises a base wall and a cylindrical side wall, said magnet being carried by said base wall. In this form there is preferably a recess in the underface of said base wall and said magnet is in said recess.

To minimise shocks when the piston lifts, there can be a resilient shock absorbing buffer carried by said piston at the upper end thereof.

In the preferred form, said cylinder is constituted by the bore of an open ended sleeve located in a chamber of said casing. In this form, the sleeve can be stepped externally to provide an upper part of larger external diameter and a lower part of smaller external diameter, there being an external sealing surface between said parts of the sleeve and a sealing ring carried by said casing, said sealing ring encircling said sleeve, and said surface bearing on the sealing ring to prevent gas leaking from said inlet to said outlet between the sleeve and said casing. It is also possible for the sleeve to be stepped internally so as to provide an upper part of larger internal diameter and a lower part of smaller internal diameter, the upper part having an array of internal, axially extending ribs, the effective internal diameter of said upper part, measured diametrically across said ribs, being the same as the internal diameter of said lower part.

To enable the device to cope with the flow rates needed for cooking and water heating one or more holes can be provided in said upper part which holes place the interior of the sleeve in communication with said outlet.

The chamber can be stepped at its upper end so as to provide an annular surface, the upper end of the sleeve being in contact with said annular surface and there being notches in said upper end to permit gas flow between said sleeve and said annular surface. In this form, the detector can include a recess forming part of said chamber and extending upwardly from said annular surface, said piston, when in its upper position, being partly in the sleeve and partly in said recess.

The lower end portion of the sleeve may progressively decrease in internal diameter to provide a part-spherical seating surface for the piston, and the lower end of the piston can decrease progressively in diameter so that it conforms in shape to the shape of said seating surface. In a further form, said sleeve can have an inwardly directed rim at the lower end thereof, the rim providing a frusto-conical sealing face, the lower end of the piston including a chamber so as to provide a frusto-conical surface which seats on said sealing face when the piston is in its lower position.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE PREFERRED EMBODIMENTS

Figure 1:
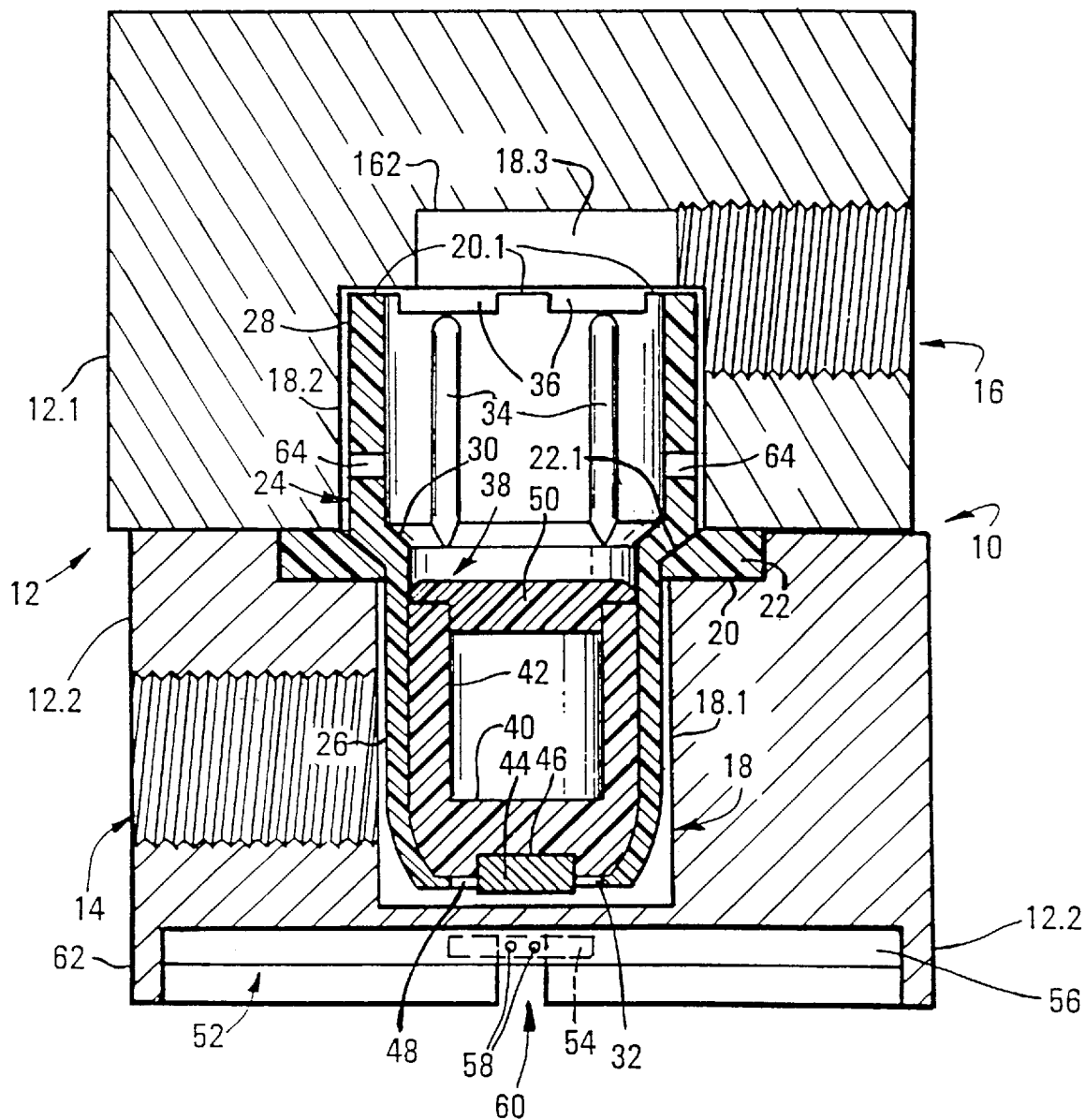
FIG. 1 is a vertical section through a gas flow detector for use on the low pressure side of a gas flow regulator.

The gas flow detector illustrated in FIG. 1 is generally designated 10 and comprises a two piece aluminium casing 12 having an internally threaded gas inlet 14 and an internally threaded gas outlet 16. The casing comprises an upper casing part 12.1 and a lower casing part 12.2. The inlet 14 is in the lower casing part 12.2 and the outlet 16 is in the upper casing part 12.1. Cap screws, studs, bolts, adhesive, or any other suitable means are used to secure the two parts 12.1, 12.2 of the casing 12 to one another. It is also possible for the two parts 12.1 and 12.2 to have compatible threads and be screwed together. The inlet 14 and outlet 16 receive gas flow pipes (not shown) which respectively lead from the gas bottle and pressure regulator and to the appliance which uses the gas.

The inlet 14 and outlet 16 are connected to one another by way of an internal chamber 18 within the casing 12. The chamber is stepped at 20 to provide a smaller diameter lower chamber part 18.1 of cylindrical cross section and a larger diameter upper chamber part 18.2 also of cylindrical cross section. There is a further step at 20.1 and, above this step which provides an annular surf ace, there is an extension 18.3 of the chamber part 18.2. The extension 18.3 is in the form of a recess of cylindrical cross section. The inlet 14 opens Into the lower chamber part 18.1 end the upper chamber part 18.2 communicates with the outlet 16. A seal 22 encircles the chamber 18 at the level of the step 20 and is located In a peripheral recess which encircles the chamber 18. The seal 22 includes an internal taper 22.1.

A hollow sleeve 24 of moulded synthetic plastics material is provided within the chamber 18. The sleeve 24 is open at its upper end and at its lower end and includes a cylindrical lower part 26, a cylindrical upper part 28 of greater diameter than the lower part 26, and a short conical part 30 which joins the parts 26 and 28. The external sealing surface of the part 30 seats on the taper 22.1 and is pressed onto the taper 22.1 when the casing parts 12.1, 12.2 are secured to one another. The ring 22 prevents gas leaking from the inlet 14 to the outlet 16 between the sleeve 24 and the casing 12.

At its lower end the part 26 progressively decreases in diameter both internally and externally thereof. Thus the part 26 has part spherical internal and external surfaces. These surfaces terminate in a peripheral lip 32 which encircles the open lower end of the part 26.

Within the upper part 28 there is a series of four equally spaced internal ribs 34 which run from the conical part 30 to the upper end of the sleeve 24. It will be noted that the effective diameter of the upper part 28, measured diametrically across the radially inner surfaces of the ribs 34, is the same as the effective diameter of the lower part 26.

The upper end of the upper part 28 is formed with a series of notches 36 which form flow paths from the interior of the sleeve 24 to the outlet 16.

The lower end of the lower part 26 of the sleeve 24 is spaced from that surface of the casing which forms the bottom of the chamber 18.

Within the sleeve 24, which constitutes a cylinder, there is a piston 38 moulded In synthetic plastics material. The piston 38 is hollow and comprises a base wall 40 and a cylindrical side wall 42. A magnet 44 is mounted in a recess 46 in the underface 48 of the base wall 40.

A resilient buffer 50 in the form of a plug is a tight fit in the open upper end of the piston 38 and acts as a shock absorber. This is because experience has shown that in use movement of the piston 38 from the lower position to the upper position can be very rapid and it is not desirable to have plastics to metal contact.

The external face of the piston 38 fits closely with the inner face of the lower part 26 of the sleeve 24 and is slightly chamfered at its lower end to match the internal part spherical surface at the lower end of the part 26. Simply by way of example the outside diameter of the piston 38 can be between 12 and 15 mm and the gap between it and the internal face of the lower part 26 can be 100 micron. When, as illustrated in FIG. 1, there is no gas flow, the piston 38 sinks to a position in which it nests snugly in the lower end of the sleeve 24. The bottom face 48 of the base wall 40 rests on the lip 32.

The piston 38 is thin walled as well as hollow and has insignificant mass (about 1 gramme). It is thus sensitive to minute pressure differences across it.

There is a cavity 52 in the lower part 12.2 of the casing 12. This cavity receives a reed switch or Hall effect switch 54 encapsulated in a disc 56 of synthetic plastics material. The switch 54 is positioned so that, when the piston 38 is in the position shown, it is subjected to the field of the magnet 44. Once the encapsulated switch 54 is in the cavity 52, the cavity is filled with a mass of epoxy resin or the like (not shown) which serves both to protect the switch from damage and also prevents tampering. The electrical leads of the switch 54 are shown at 58, the leads emerging from the casing 12 through a slot 60 in the skirt 62 which bounds the cavity 52.

It will be understood that to assemble the detector, the piston 38 is dropped into the sleeve 24, the sleeve 24 is pushed through the ring 22 and this sub-assembly inserted into the casing part 12.2 before the part 12.1 is attached. The annular surface provided by the step 20.1 presses down on the sleeve 24.

In use, the inlet 14 is connected via a gas pressure regulator to a source of gas under pressure eg a gas bottle. The outlet 16 is connected to an appliance such as a stove or water heater at which the gas is to be used.

On the assumption that the appliance is switched off, but the gas flow control valve on the bottle is open, then the pressure throughout the system downstream of the regulator stabilizes at a pressure determined by the regulator. The piston 38 is then in the position illustrated. Under gravity it has sunk to the bottom of the sleeve 24 and is supported by the lip 32. In this condition, gas pressures in the inlet 14 and outlet 16 are equal. When a burner is opened, the pressure at the outlet 16, and acting on the top face of the piston 38, drops. The pressure below the piston 38, however, remains that set by the regulator and the piston 38 thus moves upwardly in the sleeve 24. The magnet 44 moves away from the switch 54 which changes its status. This change in status of the switch can be used to signal that there is gas flow.

The piston 38 rises as far as it can, the limit to its movement being when it encounters the surface 162 of the casing part 12.1 which forms the upper end of the chamber part 18.2. The piston 38 is now partly in the upper part 28 of the sleeve 24 and partly above the sleeve 24. The part in the sleeve 24 is guided by the ribs 34. Gas can thus flow around the lower end of the piston, into the inter-rib spaces, through the notches 36 and thence to the outlet 16. If desired, to increase the rate of gas flow, holes 64 can be provided in the upper part 28 of the sleeve 24. The holes place the interior of the sleeve 24 in communication with the outlet 16.

When the burner is turned off and pressure in the system equalises throughout, the piston gravitationally sinks back down to the position illustrated and the switch 54 is changed to its other condition.

The time it takes for the piston to sink depends on the clearance between the outer cylindrical wall of the piston 38 and the inner cylindrical wall of the sleeve 24. Applicant has tested gaps of 30, 40, 50, and 100 microns. When the gap is 100 microns, the time for the piston to sink is measured in seconds. If the gap is narrowed to 30 microns, then the time for the piston to sink increases to a time which is measured in minutes. The prospects that the piston 38 will stick in the sleeve 24 are reduced by using wider gaps.

The signal from the switch 54 can be used in conjunction with a signal from another source, eg a signal indicating that a burner is on, to detect gas leaks. Thus, for example, if the detector is indicating that gas is flowing and a heat detector indicates that the burner is not on, then the system can be shut down automatically as these conditions indicate the possibility of a gas leak.

The surface of the chamber 18 can, if desired, form the cylinder for the piston 38 and the sleeve 24 can be omitted. However, the provision of the moulded plastics material sleeve means that the tolerances of the chamber 18 become less important.

Figure 2:
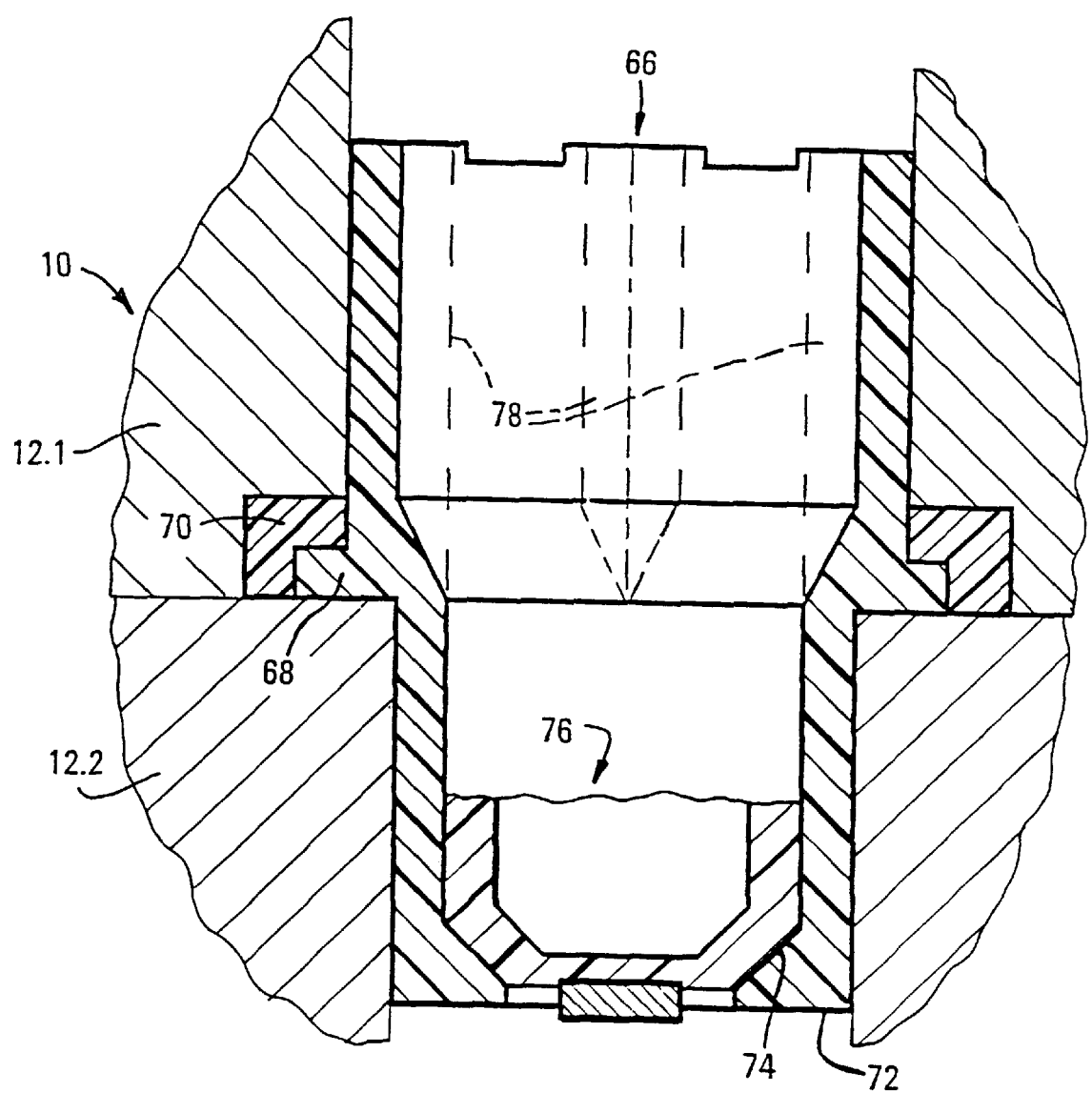
FIG. 2 is a section illustrating part of a further form of detector.

Turning now to FIG. 2 portions of the casing parts 12.1 and 12.2 are shown together with a sleeve 66. In this form the sleeve 66 includes a peripheral flange 68 and the seal 22 is replaced by a seal 70 which, in radial cross-section, is L-shaped. The seal 70 is squeezed between the two casing parts 12.1 and 12.2.

At its lower end the sleeve 66 includes an inwardly directed rim 72 which has a frusto-conical upper sealing face 74. Only the lower part of the piston, designated 76, is shown and this is chamfered so that it has a frusto-conical surface which seats on the face 74

The ribs designated 34 and 78 in the two Figures can be of semi-circular cross section (as illustrated in FIG. 1) or of triangular cross section (as illustrated in FIG. 2). In FIG. 2 the ribs 78 are shown in broken lines and not in full.

If the chamfer on the piston differs from the chamfer on the sleeve the possibility that the piston will jam in the sleeve is minimised as there will then be line contact only.

What is claimed is:

1. A gas flow detector (10) comprising a casing (12) having a gas inlet (14) and a gas outlet (16), a cylinder (24, 66) within said casing (12), a piston (38, 72) in said cylinder (24, 66), a flow path from said inlet (14) to a space below said piston (38, 76), a flow path from a space above said piston (38, 76) to said outlet (16), lifting of said piston from a lower position it occupies when there are equal gas pressures at said inlet and outlet to an upper position it occupies when the pressure at said outlet is lower than the pressure at said inlet, a magnet (44) carried by said piston at the lower end thereof and a magnetically operated switch (54) below the piston which is subjected to the field of said magnet (44) when said piston (38, 76) is in said lower position but not in the upper of said positions, characterized in that cylindrical surfaces of the piston (38, 76) and cylinder (24 66) seal said spaces off from one another whilst the piston is in its lower position, said cylindrical surfaces remaining in sealing contact during the initial part of the piston's upward travel in the cylinder, a flow path from said space below the piston to the space above the piston being opened only after the piston has completed said initial part of its upward travel.

2. A gas flow detector as claimed in claim 1, characterized in that said cylinder (24, 66) is arranged with its axis vertical so that the piston moves vertically between said two positions.

3. A gas flow detector as claimed in claim 1, characterized in that said piston (38) is hollow and comprises a base wall (40) and a cylindrical side wall (42), said magnet (44) being carried by said base wall (40).

4. A gas flow detector as claimed in claim 3, characterized in that there is a recess (46) in the underface of said base wall (40) and said magnet (44) is in said recess (46).

5. A gas flow detector as claimed in claim 1, and characterized by a shook absorbing resilient buffer (50) carried by said piston (38, 76) at the upper end thereof.

6. A gas flow detector as claimed in claim 1, characterized in that said cylinder Is constituted by the bore of an open ended sleeve (24, 66) located in a chamber (18) of said casing (12).

7. A gas flow detector as claimed in claim 6, characterized in that said sleeve (24, 66) is stepped externally to provide an upper part (28) of larger external diameter and a lower part (26) of smaller external diameter, there being an external sealing surface (22.1) between said parts of the sleeve and a sealing ring (22, 70) carried by said casing, said sealing ring (22, 70) encircling said sleeve (24, 66), and said external sealing surface pressing on the sealing ring to prevent gas leaking from said inlet to said outlet between the sleeve and said casing.

8. A gas flow detector as claimed in claim 7, and characterized by one or more holes (64) in said upper part (28) which holes place the interior of the sleeve in communication with said outlet (16).

9. A gas flow detector as claimed in claim 6, characterized by said sleeve (24, 66) is stepped internally so as to provide an upper part (28) of larger internal diameter and a lower part of smaller internal diameter, the upper part (26) having an array of internal, axially extending ribs (34, 78), the effective internal diameter of said upper part, measured diametrically across said ribs (34, 78), being the same as the internal diameter of said lower part.

10. A gas flow detector as claimed in claim 6, characterized in that said chamber (18) is stepped at its upper end so as to provide an annular surface (20.1), the upper end of the sleeve (24) being in contact with said annular surface (20.1) and there being notched (36) in said upper end to permit gas flow between said sleeve and said annular surface.

11. A gas flow detector as claimed in claim 10, and characterized by a recess (18.3) forming part of said chamber and extending upwardly from said annular surface (20.1), said piston (38), when in its upper position, being partly in the sleeve and partly in said recess.

12. A gas flow detector as claimed in claim 6, characterized in that a lower end portion of said sleeve (24) progressively decreases in internal diameter to provide a part-spherical seating surface for the piston (38), and the lower end of the piston decreases progressively in diameter so that it conforms in shape to the shape of said seating surface.

13. A gas flow detector as claimed in claim 6, characterized in that said sleeve (66) has an inwardly directed rim (72) at the lower end thereof, the rim providing a frusto-conical sealing face (74), the lower end of the piston (76) including a chamfer so as to provide a frusto-conical surface which seats on said sealing face (74) when the piston is in its lower position.

* * * * *